(12) United States Patent
Kobayashi

(10) Patent No.: US 11,630,659 B2
(45) Date of Patent: Apr. 18, 2023

(54) IN-VEHICLE UPDATE DEVICE, UPDATE PROCESSING PROGRAM, AND PROGRAM UPDATE METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuya Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 80 days.

(21) Appl. No.: 17/434,651

(22) PCT Filed: Feb. 27, 2020

(86) PCT No.: PCT/JP2020/007925
§ 371 (c)(1),
(2) Date: Aug. 27, 2021

(87) PCT Pub. No.: WO2020/179592
PCT Pub. Date: Sep. 10, 2020

(65) Prior Publication Data
US 2022/0197630 A1     Jun. 23, 2022

(30) Foreign Application Priority Data
Mar. 4, 2019   (JP) .............................. JP2019-038882

(51) Int. Cl.
*G06F 9/44*     (2018.01)
*G06F 8/656*    (2018.01)
(Continued)

(52) U.S. Cl.
CPC ............ *G06F 8/656* (2018.02); *B60R 16/023* (2013.01); *G06F 11/1407* (2013.01)

(58) Field of Classification Search
None
See application file for complete search history.

(56) References Cited

U.S. PATENT DOCUMENTS 9,098,367 B2 *   8/2015  Ricci .......................... G06F 8/61
10,437,680 B2 *  10/2019 Kito ........................ H04L 67/34
(Continued)

FOREIGN PATENT DOCUMENTS

JP       2011-108167 A      6/2011

OTHER PUBLICATIONS

International Search Report, Application No. PCT/JP2020/007925, dated May 19, 2020. ISA Japan Patent Office.

*Primary Examiner* — Anna C Deng
(74) *Attorney, Agent, or Firm* — Honigman LLP (57) ABSTRACT

Provided is an in-vehicle update device for acquiring an update program transmitted from an external server located outside a vehicle, and performing processing for updating a program for an in-vehicle control device mounted in the vehicle, the in-vehicle update device including a storage unit, and a control unit, in which the acquired update program is stored in the storage unit, the control unit is configured to control transmission of the acquired update program to the in-vehicle control device, the control unit interrupts the transmission due to stop of the vehicle, compares derivation values respectively derived based on the update program stored in the storage unit before and after the interruption with each other, and determines the validity of the update program stored in the storage unit based on a comparison result.

6 Claims, 4 Drawing Sheets

(51) Int. Cl.
B60R 16/023 (2006.01)
G06F 11/14 (2006.01)

(56) References Cited

U.S. PATENT DOCUMENTS

2019/0048648 A1* 2/2019 Lickfelt .............. H04L 12/2829
2020/0174781 A1* 6/2020 Buecherl ................ G06F 8/654
2020/0174782 A1* 6/2020 Buecherl ................ G06F 8/654
2020/0394033 A1* 12/2020 Hayashidera ......... B60R 16/023

* cited by examiner

IN-VEHICLE UPDATE DEVICE, UPDATE PROCESSING PROGRAM, AND PROGRAM UPDATE METHOD

CROSS-REFERENCE TO RELATED APPLICATIONS

This application is the U.S. national stage of PCT/JP2020/007925 filed on Feb. 27, 2020, which claims priority of Japanese Patent Application No. JP 2019-038882 filed on Mar. 4, 2019, the contents of which are incorporated herein.

TECHNICAL FIELD

The present disclosure relates to an in-vehicle update device, an update processing program, and a program update method.

BACKGROUND

Vehicles are provided with in-vehicle control devices such as in-vehicle ECUs (Electronic Control Units) for controlling in-vehicle devices such as those of a power train system for controlling an engine or the like, and a body system for controlling an air conditioner or the like. Each in-vehicle control device includes a computation processing unit such as an MPU (Micro Processing Unit), a rewriteable nonvolatile storage unit such as a RAM (Random Access Memory), and a communication unit for communicating with another in-vehicle control device, and controls an in-vehicle device by reading and executing a control program stored in the storage unit thereof. Furthermore, vehicles are equipped with a relay device (in-vehicle update device) that has wireless communication functionality. An external network, such as an external server, and downloads (receives) a control program for an in-vehicle control device from the program providing device. The downloaded program is stored in the storage unit of the relay device. The program stored in the storage unit is transmitted to the in-vehicle control device, and the control program for the in-vehicle control apparatus is updated (re-programmed) (see JP 2017-97851A).

When an in-vehicle update device acquires a program from an external server, if re-programming is interrupted before the program is transmitted to an in-vehicle control device in which the program is to be re-programmed, there is a risk of the program stored in the storage unit of the in-vehicle update device being tampered with and becoming an unauthorized program during the interruption. However, in JP 2017-97851A, no consideration is given to the validity of the program stored in the storage unit of the in-vehicle update device when an interruption occurs as described above.

SUMMARY

The present disclosure is made in view of the above circumstances, and an object thereof is to provide an in-vehicle update device that can ensure the validity of a program stored in a storage unit of the in-vehicle update device.

An in-vehicle update device according to an aspect of the present disclosure is an in-vehicle update device for acquiring an update program transmitted from an external server located outside a vehicle, and performing processing for updating a program for an in-vehicle control device mounted in the vehicle, the in-vehicle update device including a storage unit and a control unit, in which the acquired update program is stored in the storage unit, the control unit is configured to control transmission of the acquired update program to the in-vehicle control device, and the control unit interrupts the transmission due to stoppage of the vehicle, compares derivation values respectively derived based on the update program stored in the storage unit before and after the interruption with each other, and determines the validity of the update program stored in the storage unit based on a comparison result.

Advantageous Effects of Present Disclosure

According to an aspect of the present disclosure, an in-vehicle update device that can ensure the validity of a program stored in a storage unit of the in-vehicle update device can be provided.

DETAILED DESCRIPTION OF PREFERRED EMBODIMENTS

First, embodiments of the present disclosure will be listed and described. At least some of the embodiments described below may be combined together in any manner.

An in-vehicle update device according to an aspect of the present disclosure is an in-vehicle update device for acquiring an update program transmitted from an external server located outside a vehicle, and performing processing for updating a program for an in-vehicle control device mounted in the vehicle, the in-vehicle update device including a storage unit and a control unit, in which the acquired update program is stored in the storage unit, the control unit is configured to control transmission of the acquired update program to the in-vehicle control device, and the control unit interrupts the transmission due to stoppage of the vehicle, compares derivation values respectively derived based on the update program stored in the storage unit before and after the interruption with each other, and determines the validity of the update program stored in the storage unit based on a comparison result.

With this aspect, when resuming transmission of the update program stored in the storage unit to the in-vehicle control device after being interrupted, the control unit determines the validity of the update program stored in the storage unit. Accordingly, when resuming the transmission, the validity of the update program stored in the storage unit can be ensured. For example, the fact that the update program has not been altered without authorization during the interruption can be ensured.

In the in-vehicle update device according to an aspect of the present disclosure, in a case where the derivation values before and after the interruption are different from each other, the control unit determines that the update program stored in the storage unit is unauthorized, and acquires the update program from the beginning from the external server.

With this aspect, if it is determined that the update program stored in the storage unit is unauthorized, the control unit acquires the update program from the external server from the beginning and resumes the update of the in-vehicle control device. Accordingly, it is possible to prevent an unauthorized update program from being transmitted to the in-vehicle control device.

In the in-vehicle update device according to an aspect of the present disclosure, in a case where the derivation values before and after the interruption are the same, the control unit determines that the update program stored in the storage unit is authorized, and resumes the transmission from an interruption point.

With this aspect, if it is determined that the update program stored in the storage unit is authorized, the control unit resumes the update of the in-vehicle control device using the update program stored in the storage unit. Accordingly, there is no need to acquire the update program again after ensuring the validity of the update program stored in the storage unit, thus making it possible to reduce a communication cost and processing time for acquiring the update program.

In the in-vehicle update device according to an aspect of the present disclosure, the interruption point is derived based on a check point included in the acquired update program.

With this aspect, the update of the in-vehicle control device is resumed from the interruption point derived from the check point included in the update program. Accordingly, the update is efficiently resumed.

In the in-vehicle update device according to an aspect of the present disclosure, after the update program is transmitted to the in-vehicle control device, the control unit deletes the update program stored in the storage unit from the storage unit.

With this aspect, since the update program stored in the storage unit is deleted after the update program is transmitted to the in-vehicle control device, it is possible to prevent a case in which the storage unit is burdened by the update program.

An update processing program according to an aspect of the present disclosure is an update processing program for causing a computer to execute processing for: acquiring an update program transmitted from an external server located outside of a vehicle; storing the acquired update program in a storage unit; transmitting the update program to an in-vehicle control device; comparing derivation values respectively derived based on the update program stored in the storage unit before and after the interruption of the transmission with each other; and determining the validity of the update program stored in the storage unit based on a comparison result.

With this aspect, it is possible to cause a computer to function as the in-vehicle update device according to an aspect of the present disclosure.

A method for updating a program according to an aspect of the present disclosure is a program update method including the steps of: acquiring an update program transmitted from an external server located outside of a vehicle; storing the acquired update program in a storage unit; transmitting the update program to an in-vehicle control device; comparing derivation values respectively derived based on the update program stored in the storage unit before and after the interruption of the transmission with each other; and determining the validity of the update program stored in the storage unit based on a comparison result.

With this aspect, when resuming the transmission of the update program stored in the storage unit to the in-vehicle control device after being interrupted, the validity of the update program stored in the storage unit is determined. Accordingly, it is possible to provide a method for updating a program that can ensure the validity of the update program stored in the storage unit when resuming the transmission.

The following specifically describes the present disclosure based on drawings that illustrate embodiments thereof. An in-vehicle update device 2 according to the embodiments of the present disclosure will be described below with reference to the drawings. Note that the present disclosure is not limited to the examples, but is indicated by the claims, and is intended to include all modifications within the meaning and scope equivalent to the scope of the claims.

First Embodiment

Figure 1:
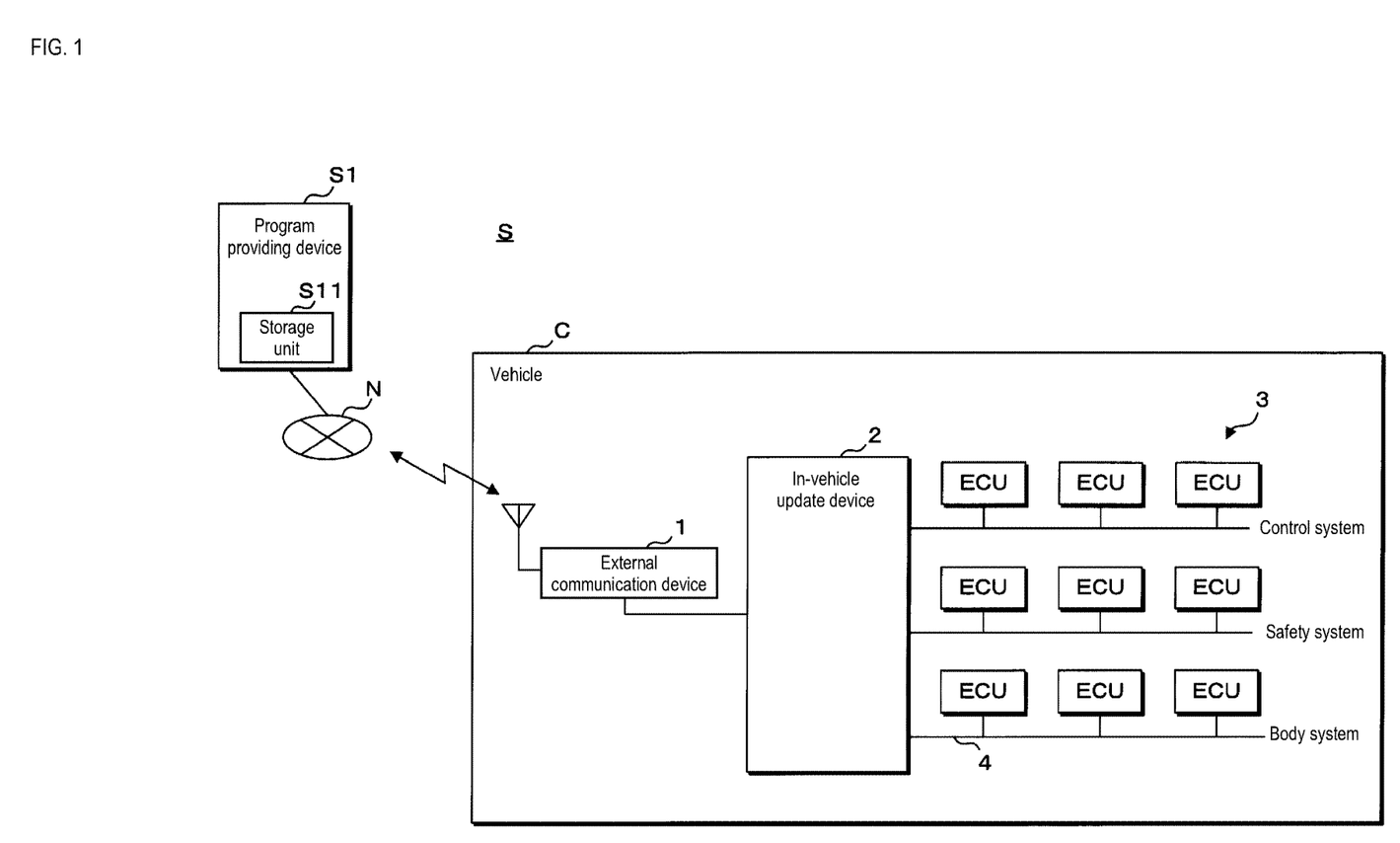
FIG. 1 is a schematic diagram showing a configuration of an in-vehicle update system according to a first embodiment.
Figure 2:
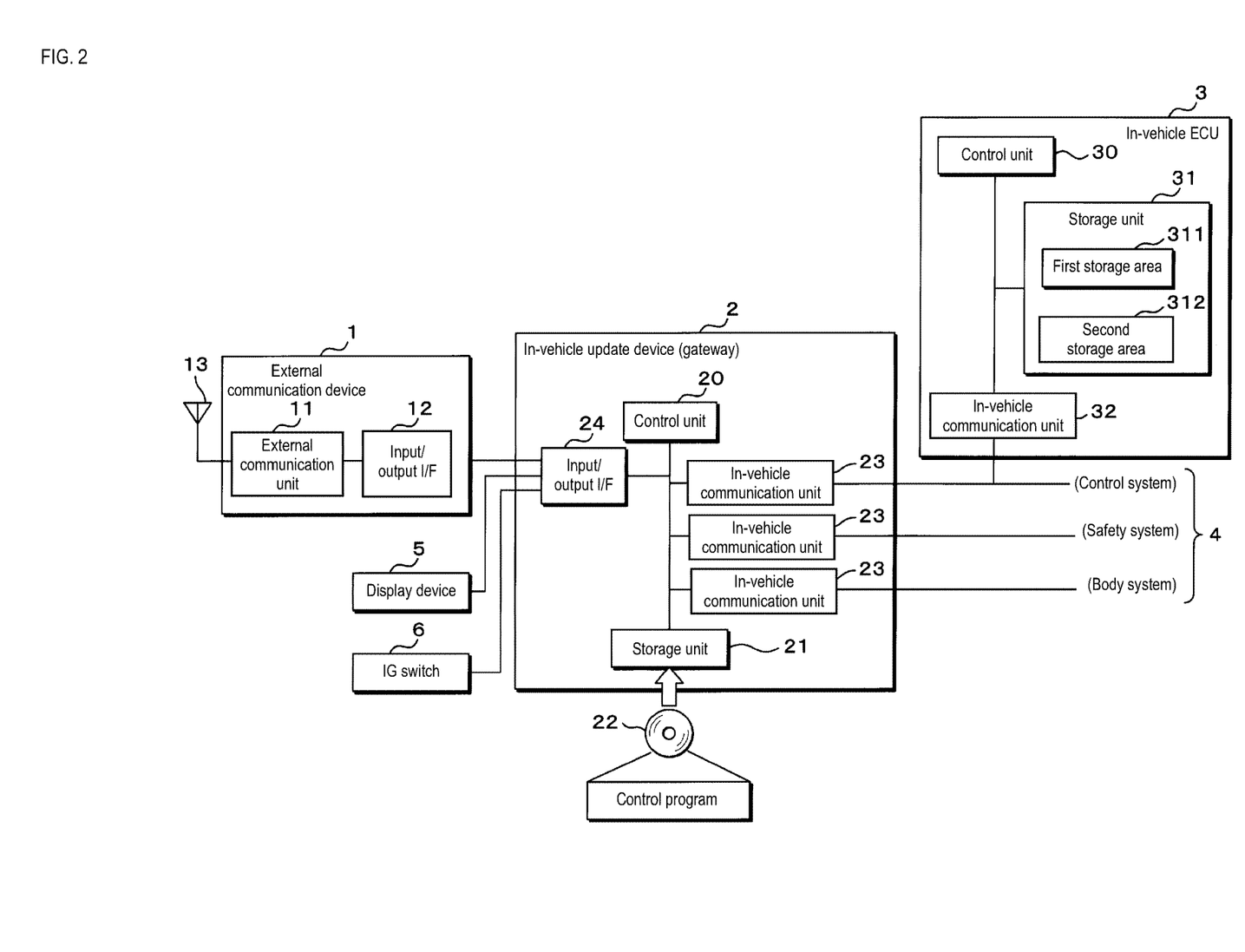
FIG. 2 is a block diagram showing a configuration of an in-vehicle update device and the like according to the first embodiment.

The following describes an embodiment based on the drawings. FIG. 1 is a schematic diagram showing a configuration of an in-vehicle update system S according to a first embodiment. FIG. 2 is a block diagram showing a configuration of an in-vehicle update device 2 and the like according to the first embodiment. The in-vehicle update system S includes an external communication device 1 and the in-vehicle update device 2, which are provided in a vehicle C, and transmits a program or data acquired from a program providing device S1 that is connected to the in-vehicle update system S via an external network N, to an in-vehicle control device 3 (in-vehicle ECU) provided in the vehicle C.

The program providing device S1 is a computer such as a server connected to the external network N such as, for example, the Internet or a public network, and includes a storage unit S11 realized by a RAM, a ROM (Read Only Memory), a hard disk, or the like. The program providing device S1 corresponds to an external server outside of the vehicle. A program or data for controlling an in-vehicle control device 3, created by the manufacturer or the like of the in-vehicle control device 3, is stored in the storage unit S11 of the program providing device S1. This program or data is transmitted as an update program to the vehicle C as will be described later, and is used to update a program or data of an in-vehicle control device 3 provided in the vehicle C. The program providing device (external server) S1 with such a configuration is also referred to as an OTA (Over The Air) server. As a result of an in-vehicle control device 3 provided in the vehicle C acquiring the update program transmitted wirelessly from the program providing device S1, and applying the update program as a program to be executed, the program executed by the receiving in-vehicle control device can be updated (re-programmed).

Hereinafter, the program is described as a program that includes: a program code that contains control syntax that is to be used by an in-vehicle control device 3 to perform processing; and an external file that contains data to be referred to when the program code is executed. When the update program is transmitted, an external file that contains such a program code and data is transmitted from the program providing device S1 as, for example, an encrypted archive file.

The vehicle C is provided with the external communication device 1, the in-vehicle update device 2, a display device 5, an ignition switch 6, and a plurality of in-vehicle control devices 3 for controlling various in-vehicle devices. The external communication device 1 and the in-vehicle update device 2 are connected via a harness such as a serial cable harness so as to be able to communicate with each other. The in-vehicle update device 2 and the in-vehicle control device 3 are connected via an in-vehicle LAN 4 that conforms to a communication protocol such as a CAN (Control Area Network (registered trademark)) or Ethernet (registered trademark) so as to be able to communicate with each other.

The external communication device 1 includes an external communication unit 11, and an input/output I/F (interface) 12 for communicating with the in-vehicle update device 2. The vehicle exterior communication unit 11 is a communication device for performing wireless communication using a mobile communication protocol such as 3G, LTE, 4G, or Wi-Fi, and transmits data to, and receives data from, the program providing device S1 via an antenna 13 connected to the external communication unit 11. Communication between the external communication device 1 and the program providing device S1 is performed via an external network such as a public network or the Internet, for example.

The input/output I/F 12 is a communication interface for performing, for example, serial communication between the external communication device 1 and the in-vehicle update device 2. The external communication device 1 and the in-vehicle update device 2 communicate with each other via the input/output I/F 12 and a harness such as a serial cable connected to the input/output I/F 24 included in the in-vehicle update device 2. In the present embodiment, the external communication device 1 and the in-vehicle update device 2 are separate devices and are connected via the input/output I/F 12 so as to be able to communicate with each other. However, the present invention is not limited to such a configuration. The external communication device 1 may be built into the in-vehicle update device 2 as one constitutional part of the in-vehicle update device 2.

The in-vehicle update device 2 includes a control unit 20, the storage unit 21, and in-vehicle communication units 23. The in-vehicle update device 2 is configured to acquire an update program that the external communication device 1 has received from the program providing device S1 via wireless communication, from the external communication device 1, and transmit the update program to a predetermined in-vehicle control device 3 (an update-target in-vehicle control device 3) via the in-vehicle LAN 4. The in-vehicle update device 2 is a gateway (repeater) that integrates segments of a plurality of systems such as those of an in-vehicle control device 3 of a control system, an in-vehicle control device 3 of a safety system, and an in-vehicle control device 3 of a body system, and the like, for example, and relays communication between the in-vehicle control devices 3 in these segments. Alternatively, the in-vehicle update device 2 may be configured as one functional unit of a body ECU that controls the entirety of the vehicle C.

The control unit 20 is realized by a CPU (Central Processing Unit), an MPU or the like, and is configured to perform various kinds of control processing, computation processing, and the like by reading out and executing a control program and data stored in the storage unit 21 in advance. The control unit 20 transmits the update program to the in-vehicle control device 3 via the in-vehicle communication unit 23. The control unit 20 performs derivation of a derivation value based on the update program stored in the storage unit 21 and determination of the validity of the update program stored in the storage unit 21 by performing a comparison using the derivation value thus derived. The control unit 20 deletes the update program stored in the storage unit 21.

The storage unit 21 is realized by a volatile memory device such as a RAM or a nonvolatile memory device such as a ROM, an EEPROM (Electrically Erasable Programmable ROM), or a flash memory, and a control program and data to be referred to at the time of processing are stored therein in advance. The control program stored in the storage unit 21 may be a control program read out from a recording medium 22 that can be read by the in-vehicle update device 2, and stored in the storage unit 21. Also, the control program may be a control program downloaded from an external computer (not shown) connected to a communication network (not shown), and stored in the storage unit 21. As will be described in detail later, the program or data for deriving the derivation value, and the update program acquired from the program providing device S1 are stored in the storage unit 21.

The in-vehicle communication units 23 are input/output interfaces that employ a communication protocol such as CAN (registered trademark) or Ethernet (registered trademark), and the control unit 20 communicates with the in-vehicle control devices 3 that are connected to the in-vehicle LAN 4 or another in-vehicle device such as a relay device via the in-vehicle communication units 23. A plurality of (three in the drawing) in-vehicle communication units 23 are provided, and communication lines that constitute the in-vehicle LAN 4 are respectively connected to the in-vehicle communication units 23. By providing a plurality of in-vehicle communication units 23 in this way, the in-vehicle LAN 4 is divided into a plurality of segments, and the in-vehicle control devices 3 are connected to the respective segments according to the function (a control system function, a safety system function, or a body system function) of the in-vehicle control device 3.

Each in-vehicle control device 3 includes a control unit 30, a storage unit 31, and an in-vehicle communication unit 32. The storage unit 31 is realized by a volatile memory device such as a RAM or a nonvolatile memory device such as a ROM, an EEPROM, or a flash memory, and a program or data for the in-vehicle control device 3 is stored therein. This program or data is the update target that is to be updated with the update program transmitted from the in-vehicle update device 2.

The storage unit 31 includes a first storage area (a first bank) 311 and a second storage area (a second bank) 312. The storage unit 31 stores two programs, namely a program (a current version) that is currently executed (applied) by the in-vehicle control device 3 and a program (an old version) that was applied before the current version. The current version program and the old version program are separately stored in the first storage area 311 and the second storage area 312. That is to say, if the current version program is stored in the first storage area 311, the old version program is stored in the second storage area 312. If the old version program is stored in the first storage area 311, the current version program is stored in the second storage area 312. In this way, by storing two programs, i.e., the current version and the old version, in the form of a so-called "dual-bank storage", even if a problem occurs in the current version program, the control unit 30 reads and executes (switches to) the old version program that ran properly when it was previously applied. Thus, it is possible to ensure the reliability of the in-vehicle control device 3.

The storage unit 31 stores information regarding the versions of the two programs, namely, the current version and the old version, and information regarding the area (the operating bank) in which the currently executed (applied) program is stored. That is to say, if the program stored in the first storage area (the first bank) 311 is currently executed, the storage unit 31 stores information indicating that the operating bank is the first storage area (the first bank) 311. If the program stored in the second storage area (the second bank) 312 is currently executed, the storage unit 31 stores information indicating that the operating bank is the second storage area (the second bank) 312. The storage unit 31 stores information regarding the version of the programs (the current version and the old version) and information regarding the operating bank.

The control unit 30 is realized by a CPU, an MPU, or the like, and performs control processing and the like by reading out and executing a program and data stored in the storage unit 31 (the operating bank) so that in-vehicle devices, including the in-vehicle control device 3, or actuators or the like are controlled.

The control unit 30 of the in-vehicle control device 3 receives an update program transmitted from the in-vehicle update device 2, via the in-vehicle communication unit 32, and acquires the update program. Therefore, the control unit 30 of the in-vehicle control device 3 acquires the update program transmitted from the program providing device S1, via the external communication device 1 and the in-vehicle update device 2. The control unit 30 stores the acquired update program in the storage area that is not the operating bank (the first storage area 311 or the second storage area 312). That is to say, in acquiring the update program transmitted from the in-vehicle update device 2, the control unit 30 deletes the program stored in the storage area that is not the operating bank (non-operating bank), as preparatory processing for the acquisition. Usually, the program stored in the storage area that is not the operating bank is an old version program that was executed before the current version program, and therefore the control unit 30 deletes the old version program without stopping the control function of the in-vehicle control device 3 controlling an in-vehicle device and stores the update program transmitted from the in-vehicle update device 2 to the non-operating bank.

As will be described in detail later, acquisition of the update program by the in-vehicle update device 2 from the program providing device S1 and transmission of the update program from the in-vehicle update device 2 to the in-vehicle control device 3 are performed in block units obtained by dividing the update program by a prescribed data size, for example. The blocks to be acquired and transmitted are each given block IDs for identifying the individual blocks, and as a result of the control unit 20 of the in-vehicle update device 2 storing the acquired and transmitted block IDs in the storage unit 21, the interruption point at which the previous acquisition and transmission of the update program was interrupted can be specified using the block ID as a checkpoint. The control unit 30 of the in-vehicle control device 3 may also store the received blocks ID in the storage unit 31.

After having successfully complete the reception of the update program, that is, the reception of all the blocks thus divided, the control unit 30 of the in-vehicle control device 3 switches the operating bank, and applies and executes the received update program as the current version program. In the case where the reception of the update program was successfully terminated and the operating bank was successfully switched, the control unit 30 stores information indicating that the update of the program is complete (successfully terminated) in the storage unit 31, and further transmits (makes a notification of) the information to the in-vehicle update device 2.

If the switching to the update program fails, the control unit 30 of the in-vehicle control device 3 performs rollback processing, that is, performs switching (rollback) so that the storage area of the non-operating bank in which the previous version (old version) of the program for the update program is stored serves as the storage area of the operating bank, and executes (applies) the previous version of the program. When the switching to the update program fails, the control unit 30 may store information indicating that the update has failed (was unsuccessfully terminated) in the storage unit 31, and may further transmit (make a notification of) the information to the in-vehicle update device 2.

The display device 5 is an HMI (Human Machine Interface) device such as a display of a car navigation system, for example. The display device 5 is connected to an input/output I/F 24 of the in-vehicle update device 2 via a harness such as a serial cable so as to be able to communicate with each other. The display device 5 displays data or information output from the control unit 20 of the in-vehicle update device 2 via the input/output I/F 24. The display device 5 and the in-vehicle update device 2 do not necessarily have to be connected via the input/output I/F 24 or the like, and the display device 5 and the in-vehicle update device 2 may be connected via the in-vehicle LAN 4.

The IG switch 6 is a switch for switching the operation state of a motor (not shown) such as the engine of the vehicle C. For example, a user switches the IG switch 6 on from off to activate the vehicle C, and initiates travel of the vehicle C. Thereafter, when travel by the vehicle C is ended, the user switches the IG switch 6 off from on to stop the vehicle. The IG switch 6 is connected to an input/output I/F 24 of the in-vehicle update device 2 by a harness such as a serial cable so as to be able to communicate with each other. The control unit 20 of the in-vehicle update device 2 is notified of the switching state (on or off) of the IG switch 6 via the input/output I/F 24. For example, signals indicating that the IG switch 6 is on or off are input from the IG switch 6 to the control unit 20 of the in-vehicle update device 2 via the input/output I/F 24. The connection mode between the IG switch 6 and the in-vehicle update device 2 is not limited to the connection mode realized via the input/output I/F 24, and a connection mode in which the IG switch 6 and the in-vehicle update device 2 are connected via the in-vehicle LAN 4 can be also used.

Figure 3:
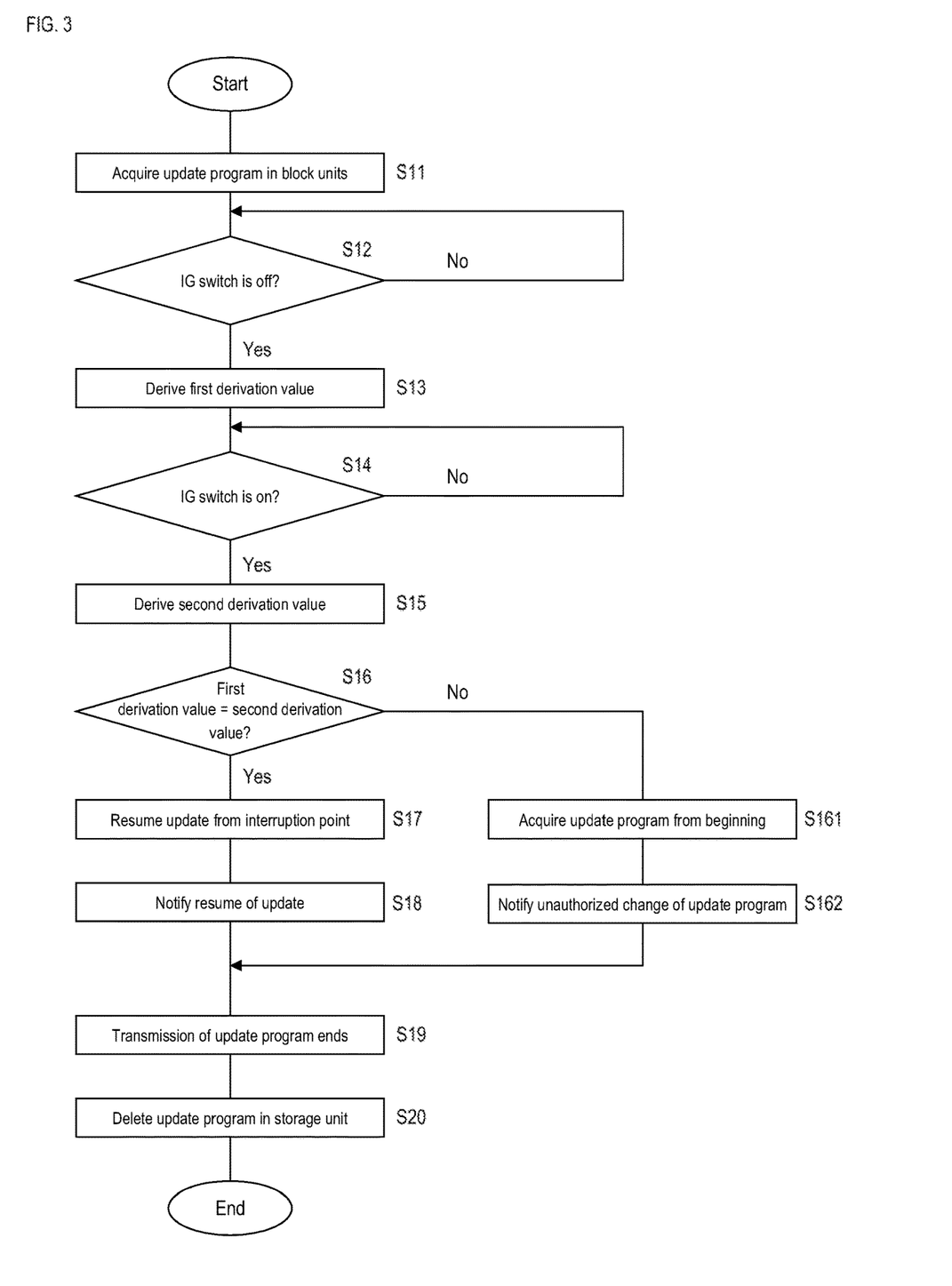
FIG. 3 is a flowchart illustrating processing of a control unit of an in-vehicle update device.
Figure 4:
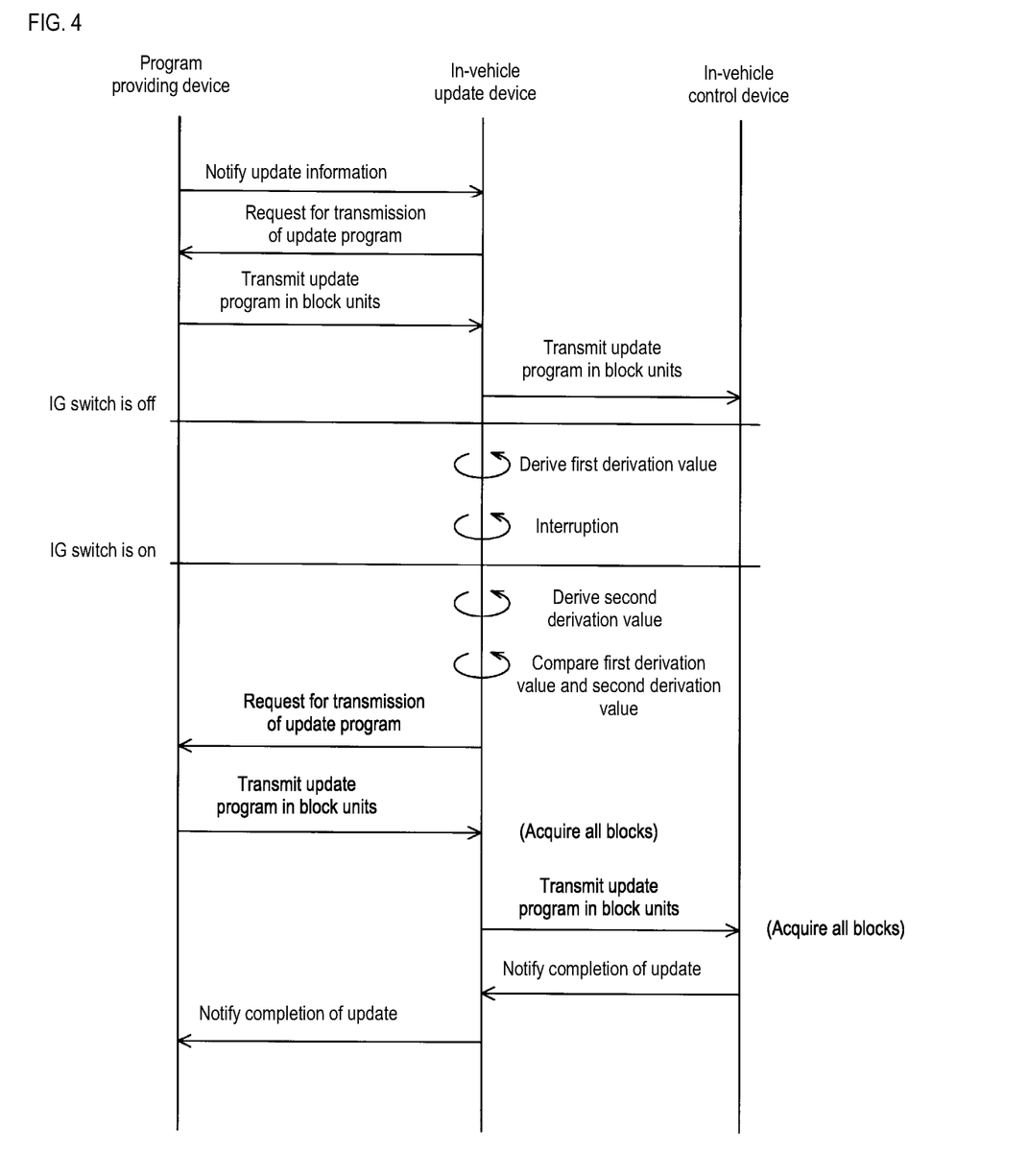
FIG. 4 is a sequence diagram showing communication signals and update programs that are exchanged between a program providing device, an in-vehicle update device, and an in-vehicle control device.

FIG. 3 is a flowchart illustrating processing of the control unit 20 of the in-vehicle update device 2. FIG. 4 is a sequence diagram showing communication signals and the update program exchanged between the program providing device S1, the in-vehicle update device 2, and the in-vehicle control device 3. If the vehicle C is in an activated state (IG switch is on), the control unit 20 of the in-vehicle update device 2 periodically or non-periodically communicates with the program providing device S1 via the external communication device 1, and if the program or data to be updated, that is, the update program is prepared in the program providing device S1, the control unit 20 performs processing as below. Alternatively, the control unit 20 may also perform processing as described below based on an update notification acquired from the program providing device S1 via the external communication device 1. The control unit 20 may display the update notification on the display device 5, and perform processing as described below based on approval of the update that is input by an operator of the vehicle C via an input terminal such as a touch panel provided on the display device 5.

Upon receiving the update information from the program providing device S1, the control unit 20 of the in-vehicle update device 2 requests the program providing device S1 to transmit the update program. The control unit 20 acquires (receives) the update program from the program providing device S1 in block units (S11), and transmits the acquired update program to the in-vehicle control device 3 in the block units. Specifically, the control unit 20 acquires the update program in block units via the external communication device 1, and the acquired update program is stored in the storage unit 21. The update program stored in the storage unit 21 is transmitted to the in-vehicle control device 3 in block units by the control unit 20 via the in-vehicle LAN 4. The update program to be acquired may be subjected to concealment processing such as encryption using a common key system or a public key system. The encrypted update program is stored in the storage unit 21 and decrypted by the control unit 20. The decrypted update program is stored in the storage unit 21 and transmitted to the in-vehicle control device 3 in block units by the control unit 20.

The control unit 20 of the in-vehicle update device 2 transmits, to the in-vehicle control device 3, the update program in block units in which the update program is divided by a predetermined data size. Alternatively, the control unit 20 may extract separators included in the update program, and divide the update program into blocks based on the separators. Similarly, the control unit 20 acquires the update program in the block units thus divided. Each block is given a block ID for identifying the block. The control unit 20 stores the block IDs of the acquired and transmitted blocks in the storage unit 21.

The control unit 20 of the in-vehicle update device 2 determines whether the transmitted block is the last block. When dividing the update program by a predetermined data size into blocks, for example, the control unit 20 determines the number of blocks to be generated. The number of blocks thus determined becomes the last number of the block ID. When completing the transmission of the update program, the control unit 20 determines whether the current block is the last block, based on whether the block ID of the block to be transmitted this time is the last number.

If the transmitted block is not the last block, the control unit 20 of the in-vehicle update device 2 transmits the block of the block ID that comes next to the block ID of the block that was last transmitted. The control unit 20 sequentially transmits the blocks of the update program divided by a predetermined data size to the in-vehicle control device 3 that is to be updated.

Upon receiving the blocks of the update program transmitted from the in-vehicle update device 2, the in-vehicle control device 3 to be updated stores the blocks in the storage region of the non-operating bank (the first storage area 311 or second storage area 312). The in-vehicle control device 3 may store the block IDs of the received blocks in the storage unit 31.

If the vehicle C is stopped, that is, the IG switch is turned off when the update program is being sequentially acquired and transmitted in the block units (step S12: YES), the acquisition and transmission of the update program in the block units are interrupted. The update program and information regarding the block ID of the block that was last acquired and transmitted remain in the storage unit 21 of the in-vehicle update device 2.

The control unit 20 of the in-vehicle update device 2 uses the stored block ID as a check point of the acquisition and transmission of the update program, and can derive the interruption point at which the acquisition and transmission of the update program was interrupted, based on the check point.

The update program may include a plurality of check points and an EOF (End Of File) indicating information that indicates the end of the file of the update program. The control unit 20 may trace back to the head of the file from the EOF to detect the check point, and derive the interruption point based on the check point that is first detected (confirmed). The check point may be represented by a predetermined character code or a separator that divides segments in the file. The method for deriving the interruption point is not limited to derivation based on the check point, and a method is also possible in which the control unit 20 communicates with the program providing device S1 to derive the interruption point.

After the vehicle C is stopped, the control unit 20 of the in-vehicle update device 2 derives a first derivation value based on the update program stored in the storage unit 21 using power accumulated in a power storage device (not shown) of the in-vehicle update device 2 (step S13). In other words, the first derivation value is a derivation value that is derived based on the update program stored in the storage unit 21 before the acquisition and transmission of the update program is interrupted. The first derivation value thus derived is stored in the storage unit 21. The first derivation value is, for example, a hash value or a MAC (Message Authentication Code) value. The first derivation value that is a hash value is derived using a hash function stored in the storage unit 21 based on the update program stored in the storage unit 21. The first derivation value that is a MAC value is derived using a common key (shared key) and a MAC algorithm stored in the storage unit 21, based on the update program stored in the storage unit 21. The method for deriving the derivation value is not limited to derivation performed by the control unit 20, and a method is also possible in which the in-vehicle update device 2 is provided with a dedicated processor connected to the control unit 20 so as to be able to communicate therewith and the processor derives the derivation value.

When the vehicle C is in a stopped state, that is, in a case where the IG switch is not on (step S14: NO), the control unit 20 of the in-vehicle update device 2 performs loop processing in order to perform determination of step S14 again. When performing the loop processing, the control unit 20 may execute standby processing (sleeping) for a predetermined period of time.

In a case where the vehicle C enters the activated state again, that is, in a case where the IG switch is turned on (step S14: YES), the control unit 20 of the in-vehicle update device 2 derives a second derivation value based on the update program stored in the storage unit 21 (step S15). In other words, the second derivation value is derived based on the update program stored in the storage unit 21 after the interruption of the acquisition and transmission of the update program. The second derivation value thus derived is stored in the storage unit 21. The second derivation value is a derivation value that is derived in the same manner as that of the first derivation value, and for example, is a hash value or a MAC value.

The control unit 20 of the in-vehicle update device 2 compares the first derivation value with the second derivation value that are stored in the storage unit 21, and determines whether the two values are the same (step S16). If the first derivation value and the second derivation value are the same, the control unit 20 determines that the update program stored in the storage unit 21 is authorized. In other words, it is determined that the update program stored in the storage unit 21 has not been altered as a result of tampering or the like. By comparing the derivation values (the first derivation value and the second derivation value) respectively derived based on the update program stored in the storage unit 21 before and after the interruption with each other, the validity of the update program stored in the storage unit 21 can be determined before resuming the transmission.

If the first derivation value and the second derivation value are the same (step S16: YES), the control unit 20 resumes the update (acquisition and transmission of the update program) from the interruption point (step S17). Specifically, the control unit 20 requests the program providing device S1 to transmit the block that comes next to the block of the block ID that was last acquired in the previous (before the interruption) acquisition of the update program, and resumes acquisition of the update program in the block units. The acquired update program is stored in the storage unit 21. The update program stored in the storage unit 21 is transmitted to the in-vehicle control device 3 in the block units. Alternatively, the control unit 20 transmits, to the in-vehicle control device 3, the block of the block ID that comes next to the block ID of the block that was last transmitted in the previous transmission of the update program, and resumes the transmission of the update program to the in-vehicle control device 3 in the block units. In other words, the update of the in-vehicle control device 3 is resumed.

Since the update is resumed from the interruption point, the need for processing for acquiring and transmitting blocks that have been already acquired and transmitted in the previous acquisition and transmission of the update program is eliminated, and thus it is possible to shorten the time required from resuming the update until the completion of the update, and suppress an increase in traffic in the in-vehicle LAN 4.

The control unit 20 of the in-vehicle update device 2 causes the display device 5 to display an indication via the input/output I/F 24 to notify the operator of the vehicle C that the update has resumed (step S18).

If the first derivation value and the second derivation value are different from each other (step S16: NO), the control unit 20 of the in-vehicle update device 2 determines that the update program stored in the storage unit 21 is unauthorized. In other words, the update program stored in the storage unit 21 is determined to have been altered without authentication as a result of tampering or the like. Accordingly, in order to transmit the authorized update program, the control unit 20 acquires the update program from the program providing device S1 from the beginning (step S161). Specifically, the control unit 20 requests the program providing device S1 to transmit the update program from the block with the first block ID. The control unit 20 acquires the update program from the program providing device S1 in block units, and stores the acquired update program in the storage unit 21. The update program stored in the storage unit 21 is transmitted to the in-vehicle control device 3 in block units. Due to the update program being acquired from the beginning, it is possible to prevent an update program that has been altered without authentication from being transmitted to the in-vehicle control device 3.

The control unit 20 of the in-vehicle update device 2 causes the display device 5 to display the indication to notify the operator of the vehicle C that the update program has been altered without authentication during the vehicle C is stopped via the input/output I/F 24 (step S162). The control unit 20 may cause the display device 5 to display the indication to notify the operator of the vehicle C that the update program is to be acquired from the beginning. The control unit 20 may transmit (make a notification of) that the stored update program has been altered without authentication to the program providing device S1.

If the block of the update program that is transmitted is the last block, the control unit 20 of the in-vehicle update device 2 transmits the last block to end the transmission of the update program to the in-vehicle control device 3 (step S19). Since the acquired update program is transmitted, it goes without saying that acquisition of the update program has been completed before transmitting the last block. The control unit 20 store the fact that the update of the in-vehicle control device 3 has been completed in the storage unit 21. Although not shown in FIG. 3, if the vehicle C enters the stopped state (the IG switch 6 is turned off) again before ending transmission of the update program, the control unit 20 performs processing of step S13.

After receiving the last block transmitted from the in-vehicle update device 2, the in-vehicle control device 3 stores the fact that the update of the control device has been completed in the storage unit 31. After receiving the last block, the in-vehicle control device 3 switches the program to the update program that has been completely received, in other words, switches the operating bank to the storage area in which the update program is stored, and thereafter transmits (makes a notification of) the fact that switching to the update program has been completed (the update is complete) to the in-vehicle update device 2. The control unit 20 of the in-vehicle update device 2 may store the fact that the in-vehicle control device 3 that is to be updated has completed switching to the update program, in the storage unit 21. The control unit 20 transmits an indication of (makes a notification of) the completion of the update of the in-vehicle control device 3 which was to be updated, to the program providing device S1. The control unit 20 may cause the display device 5 to display the indication to notify the operator of the vehicle C the completion of the update of the in-vehicle control device 3, which was to be updated, via the input/output I/F 24.

After ending the transmission of the update program, the control unit 20 deletes the update program stored in the storage unit 21 (step S20). Due to the update program being deleted, it is possible to prevent the storage unit 21 from being occupied by the update program.

During the acquisition or transmission of the update program, if the vehicle C is in the activated state, that is, the IG switch is not off (step S12:NO), the control unit 20 performs loop processing in order to perform determination of step S12 again. During the loop processing, the control unit 20 continues the acquisition and transmission of the update program, and if the transmission of the update program is completed, the control unit 20 may perform processing of step S20.

The embodiments in the present disclosure are examples in all aspects, and should be construed as non-limiting. The scope of the present invention is not limited to the above meanings, but is indicated by the claims, and is intended to include all modifications within the meaning and scope equivalent to the scope of the claims.

The invention claimed is:

1. An in-vehicle update device for acquiring an update program transmitted from an external server located outside a vehicle, and performing processing for updating a program for an in-vehicle control device mounted in the vehicle, the in-vehicle update device comprising:

a processor;

a storage unit; and a control unit, wherein the update program is stored in the storage unit, the control unit is connected to the processor to control transmission of the update program to the in-vehicle control device, and the control unit executed by the processor to interrupt the transmission due to stoppage of the vehicle, compare derivation values respectively derived based on the update program stored in the storage unit before and after the interruption with each other, and determine the validity of the update program stored in the storage unit based on a comparison result, wherein, in a case where the derivation values before and after the interruption are different from each other, the update program stored in the storage unit is determined to be unauthorized, and the update program is acquired from a beginning from the external server, and wherein, in a case where the derivation values before and after the interruption are the same, the update program stored in the storage unit is determined to be authorized, and the transmission is resumed from an interruption point, wherein the interruption point is derived based on a check point included in the acquired update program.

2. The in-vehicle update device according to claim 1, wherein, after the update program is transmitted to the in-vehicle control device, the control unit deletes the update program stored in the storage unit from the storage unit.

3. A non-transitory computer readable medium storing an update processing program, the update processing program executed by a processor to cause a computer to execute processing for comprising:

acquiring an update program transmitted from an external server located outside of a vehicle;

storing the update program in a storage unit;

transmitting the update program to an in-vehicle control device;

comparing derivation values respectively derived based on the update program stored in the storage unit before and after an interruption of the transmission with each other; and determining the validity of the update program stored in the storage unit based on a comparison result, wherein, in a case where the derivation values before and after the interruption are different from each other, the update program stored in the storage unit is determined to be unauthorized, and the update program is acquired from a beginning from the external server, and wherein, in a case where the derivation values before and after the interruption are the same, the update program stored in the storage unit is determined to be authorized, and the transmission is resumed from an interruption point, wherein the interruption point is derived based on a check point included in the acquired update program.

4. The non-transitory computer readable medium according to claim 3, wherein, after the update program is transmitted to the in-vehicle control device, the control unit deletes the update program stored in the storage unit from the storage unit.

5. A program update method comprising the steps of:

acquiring an update program transmitted from an external server located outside of a vehicle;

storing the update program in a storage unit;

transmitting the update program to an in-vehicle control device;

comparing derivation values respectively derived based on the update program stored in the storage unit before and after an interruption of the transmission with each other; and determining the validity of the update program stored in the storage unit based on a comparison result, wherein, in a case where the derivation values before and after the interruption are different from each other, the update program stored in the storage unit is determined to be unauthorized, and the update program is acquired from a beginning from the external server, and wherein, in a case where the derivation values before and after the interruption are the same, the update program stored in the storage unit is determined to be authorized, and the transmission is resumed from an interruption point, wherein the interruption point is derived based on a check point included in the acquired update program.

6. The program update method according to claim 5, wherein, after the update program is transmitted to the in-vehicle control device, the control unit deletes the update program stored in the storage unit from the storage unit.

* * * * *